UNITED STATES PATENT OFFICE.

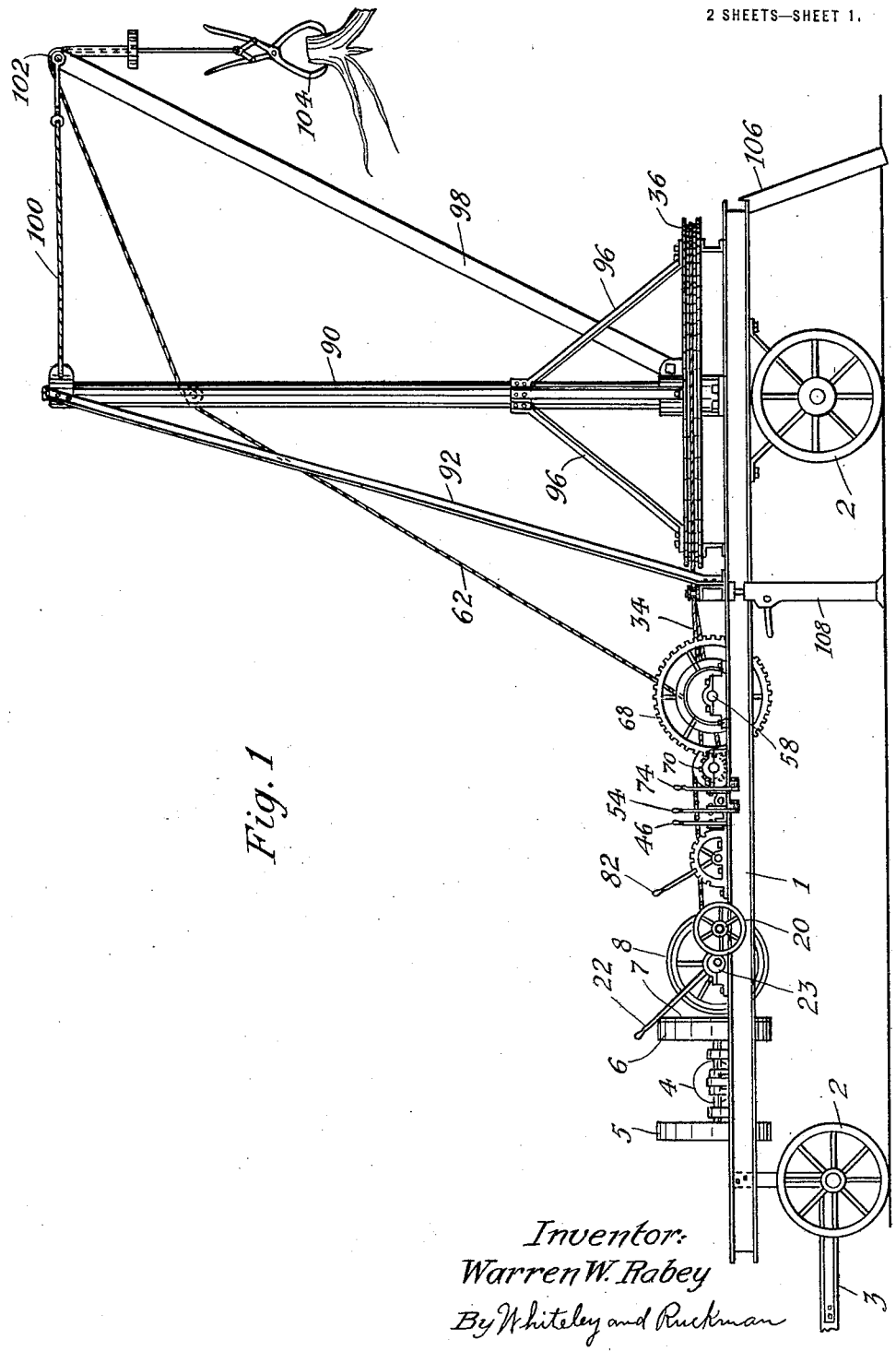

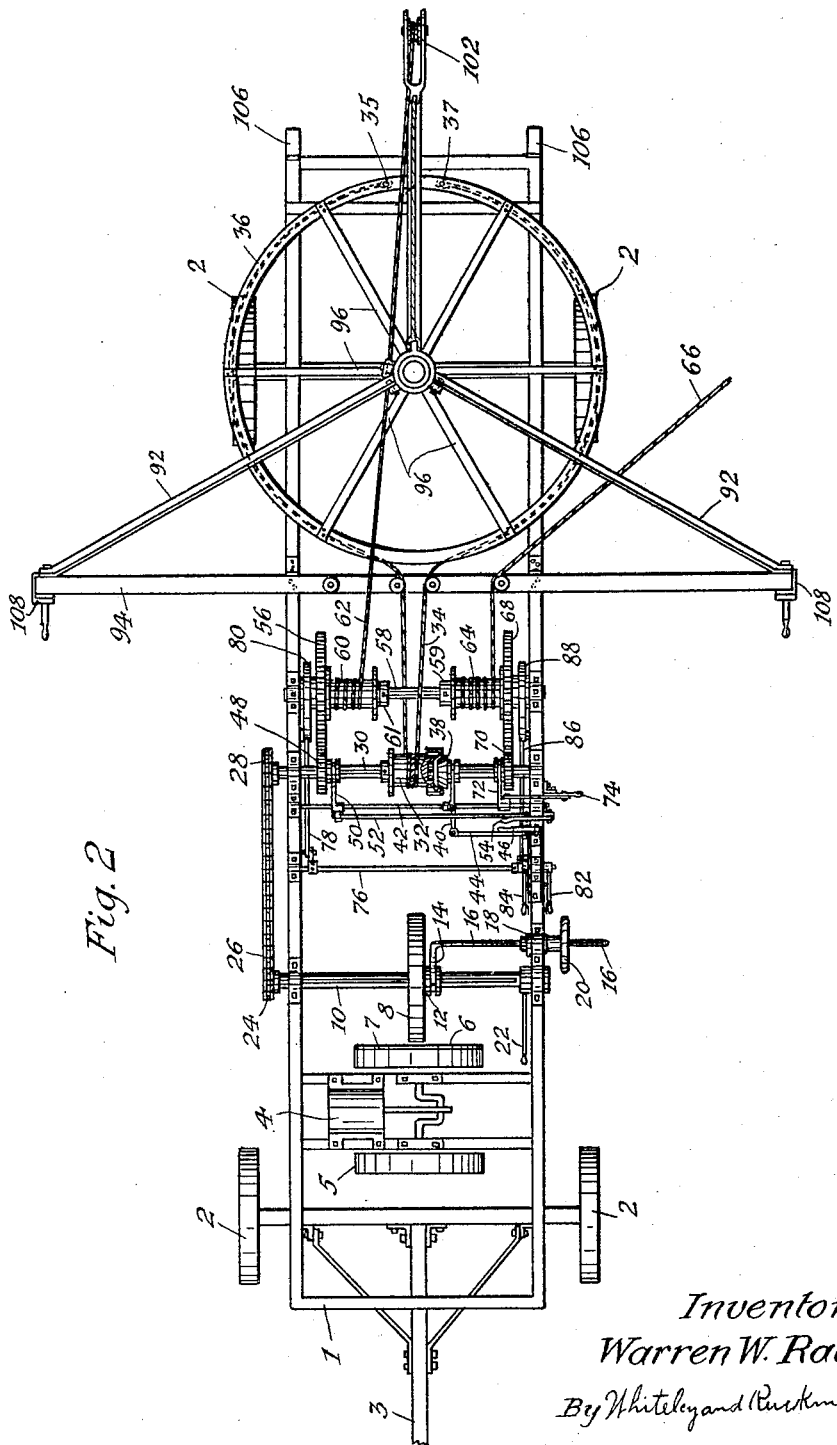

WARREN W. RABEY, OF HILL CITY, MINNESOTA.

STUMP COLLECTING AND PILING MACHINE.

1,325,579.  Specification of Letters Patent.  Patented Dec. 23, 1919.

Application filed August 31, 1918. Serial No. 252,163.

*To all whom it may concern:*

Be it known that I, WARREN W. RABEY, a citizen of the United States, residing at Hill City, in the county of Aitkin and State of Minnesota, have invented certain new and useful Improvements in Stump Collecting and Piling Machines, of which the following is a specification.

My invention relates to a stump collecting and piling machine and has for its object to provide a machine which will collect stumps, logs, windfalls, etc., and pile them in an expeditious manner.

A further object is to provide a machine of this character which may be readily moved from place to place and which consists of a minimum of parts thus rendering it easy to operate while at the same time a high degree of efficiency is obtained.

Another object is to provide a machine in which the collecting mechanism and piling mechanism can both be operated simultaneously or either one can be operated separately while the other is inoperative.

The full objects and advantages of my invention will appear in connection with the detailed description thereof and are particularly pointed out in the claims.

In the drawings, illustrating the application of my invention in one form, Figure 1 is a view in side elevation. Fig. 2 is a top plan view.

The machine is mounted upon a truck having a frame 1 supported by wheels 2 and having a tongue 3 by which the machine may be readily moved from one place to another. An engine 4 is mounted upon the frame and the crank shaft of the engine is provided with two fly wheels 5 and 6. A plate 7 secured to the face of the fly wheel 6 constitutes one member of a frictional transmission. The other member 8 of this transmission is splined upon a shaft 10 mounted in bearings on the frame. The member 8 has a grooved collar 12 secured thereto in which is engaged the forked end of a screw threaded rod 16 passing through a screw threaded bearing 18 and having a hand wheel 20 by which it can be rotated to bring the member 8 to either side of the center of member 7 and thus not only change the speed of the driving but also the direction of rotation. One end of the shaft is mounted in an eccentric bearing 23 and is provided with a hand lever 22 for the purpose of engaging and disengaging the member 8 with relation to member 6. On the other end of the shaft 10 is secured a sprocket wheel 24 connected by sprocket chain 26 to a sprocket wheel 28 on a shaft 30 mounted in bearings on the frame. Upon shaft 30 is rotatably mounted a drum 32 around which is wrapped the central portion of a cable 34, the ends of which pass in opposite directions around a turn table 36 with the extreme ends thereof secured to the turn table at 35 and 37. Splined upon the shaft 30 is a clutch 38 which may be engaged and disengaged in relation to the drum 32 by means of a lever 40 pivoted upon the rod 42 secured to the frame. To the end of the lever 40 is pivotally connected a rod 44 operated by hand lever 46. A gear 48 is splined on the shaft 30 and is provided with a collar engaged by an arm 50 on a rod 52 controlled by hand lever 54 for sliding the gear 48 into and out of mesh with a gear 56 loose on a shaft 58 supported in bearings upon the frame. Secured to the gear 56 is a drum 60 held in place loosely on the shaft 58 by a collar 61 secured to the shaft and a cable 62 passes around this drum and leads to a member which will later be described. Another drum 64 is secured to the shaft 58 by a set screw 59 and a cable 66 passes around this drum and extends outwardly from the machine to constitute a field cable for collecting stumps, logs, etc. Adjacent the drum 64 is a gear 68 secured to the shaft 58 and a gear 70 splined upon the shaft 30 is brought into engagement or disengaged from the gear 68 by means of a collar engaged by an arm 72 operatively connected with a hand lever 74. Shaft 76 is rotatably mounted in bearings upon the frame and has a connection 78 with a brake band 80 passing around a drum secured to the gear 56. To the other end of the shaft 76 is secured a hand lever 82 for operating the same. Rotatably mounted upon shaft 76 is a hand lever 84 having a connection 86 with a brake band 88 on a drum secured to the gear 68.

From this construction it is evident that drums 60 and 64 may be rotated simultaneously or either may be rotated separately while the other is inoperative.

Upon the turn table 36 is mounted a mast 90 having braces 92 rotatably connected with the top of the mast and extending to a bar 94 which extends across the frame and is secured thereto. Short braces 96 connect the mast to the turn table. A boom 98 is pivotally connected at its lower end to the turn table and the upper end thereof may be held in adjusted position with relation to the mast by the cable 100. At the top of the boom is a pulley 102 over which passes the cable 62 previously referred to. Tongs 104 are secured to the end of the cable for lifting stumps and piling them. The rear of the frame may be supported by a prop 106 and a lifting jack 108 by means of which the downward strain on the rear of the truck may be carried.

The advantages of my invention will be obvious from the foregoing description. By means of the cable 66 stumps and logs may be collected and drawn to a position adjacent the turn table and the latter may be turned into proper position so that they may be engaged by the tongs 104 for lifting and depositing in a pile. It is to be noted that the collecting mechanism and the piling mechanism may be operated simultaneously or either of them may be operated separately while the other one is at rest.

I claim:

1. A stump collecting and piling machine comprising a truck frame, an engine mounted on said frame, a transverse shaft journaled in said frame, driving connections between said shaft and said engine, a second transverse shaft journaled in said frame, driving connections between said shafts, a drum rotatably mounted on said second shaft, a clutch interposed between said drum and said second shaft, a turn table mounted on said frame, means for operating said turn-table from said drum, a third transverse shaft journaled in said frame, a drum rotatably mounted on said third shaft, a boom carried by said turn table, a cable passing over said boom and wound upon one end of said last mentioned drum, driving connections between said drum and said second shaft, a second drum mounted on said third shaft, driving connections between said last mentioned drum and said second shaft, and a field cable wound at one end upon said last mentioned drum.

2. A stump collecting and piling machine comprising a truck frame, an engine mounted on said frame, a transverse shaft journaled in said frame, driving connections between said shaft and said engine, a second transverse shaft journaled in said frame, driving connections between said shafts, a drum rotatably mounted on said second shaft, a clutch interposed between said drum and said second shaft, a turn table mounted on said frame, a cable having its middle portion wound upon said drum and its ends secured to said turn table, a third transverse shaft journaled in said frame, a drum rotatably mounted on said third shaft, a boom carried by said turn table, a cable passing over said boom and wound at one end upon said last mentioned drum, disengageable driving connections between said drum and said second shaft, a second drum mounted on said third shaft, disengageable driving connections between said last mentioned drum and said second shaft, and a field cable wound at one end upon said last mentioned drum.

3. A stump collecting and piling machine comprising a truck frame, an engine mounted on said frame, a transverse shaft journaled in said frame, a friction gear splined on said shaft, means for adjustably engaging said friction gear with the fly wheel of said engine, a second transverse shaft journaled in said frame, driving connections between said shafts, a drum rotatably mounted on said second shaft, a clutch interposed between said drum and said second shaft, a turn table mounted on said frame, a cable having its middle portion wound upon said drum and its ends secured to said turn table, a third transverse shaft journaled in said frame, a drum rotatably mounted on said third shaft, a boom carried by said turn table, a cable passing over said boom and wound at one end upon said last mentioned drum, disengageable driving connections between said drum and said second shaft, a second drum mounted on said third shaft, disengageable driving connections between said last mentioned drum and said second shaft, and a field cable wound at one end upon said last mentioned drum.

In testimony whereof I hereunto affix my signature.

WARREN W. RABEY.